United States Patent
Angermayer et al.

(10) Patent No.: US 10,140,385 B2
(45) Date of Patent: Nov. 27, 2018

(54) CONFIGURING A PRESENTATION OF DATA BASED ON A CONTEXT

(71) Applicant: SuccessFactors, Inc., South San Francisco, CA (US)

(72) Inventors: Thomas Angermayer, Sankt Leon-Rot (DE); Begona Fernandez Martinez, Sankt Leon-Rot (DE); Silke Storch, Sankt Leon-Rot (DE)

(73) Assignee: SuccessFactors, Inc., South San Francisco, CA (US)

( * ) Notice: Subject to any disclaimer, the term of this patent is extended or adjusted under 35 U.S.C. 154(b) by 463 days.

(21) Appl. No.: 14/883,320

(22) Filed: Oct. 14, 2015

(65) Prior Publication Data

US 2017/0109003 A1   Apr. 20, 2017

(51) Int. Cl.
*G06F 17/00*   (2006.01)
*G06F 17/30*   (2006.01)

(52) U.S. Cl.
CPC .............. *G06F 17/30979* (2013.01)

(58) Field of Classification Search
CPC ................................ G06F 17/30292
See application file for complete search history.

(56) References Cited

U.S. PATENT DOCUMENTS

| | | | | |
|---|---|---|---|---|
| 7,062,502 B1* | 6/2006 | Kesler | .................. | G06F 17/3056 |
| 9,213,698 B1* | 12/2015 | Tsypliaev | ............ | G06F 17/3056 |
| 9,378,226 B1* | 6/2016 | Wu | ................... | G06F 17/30292 |
| 2002/0103876 A1* | 8/2002 | Chatani | ............. | G06F 17/30864 |
| | | | | 709/217 |
| 2006/0143220 A1* | 6/2006 | Spencer, Jr. | .............. | G06F 8/20 |
| 2006/0190844 A1* | 8/2006 | Binder | ...................... | G06F 8/34 |
| | | | | 715/853 |
| 2007/0288890 A1* | 12/2007 | Wells | ........................ | G06F 8/38 |
| | | | | 717/113 |
| 2009/0132548 A1* | 5/2009 | Kagawa | ............ | G06F 17/30011 |
| 2009/0313278 A1* | 12/2009 | DeWoolfson | ..... | G06F 17/30604 |
| 2012/0310989 A1* | 12/2012 | Weissman | ......... | G06F 17/30595 |
| | | | | 707/793 |
| 2014/0181703 A1* | 6/2014 | Sullivan | .................. | G06F 9/451 |
| | | | | 715/762 |

* cited by examiner

*Primary Examiner* — Justin S Lee
(74) *Attorney, Agent, or Firm* — Fish & Richardson P.C.

(57) ABSTRACT

A data model defines a structure of data objects with data fields, together with presentation properties. Data is stored according to data models. A request is received that identifies a data object described in a data model. Based on the request, data associated with the data object is invoked according to the data model. The data associated with the data object is invoked from a database and comprises fields' data, field identifiers, field labels, and field properties assigned to a plurality of fields of the data object. A set of contexts is defined to be associated with the data model. A context from the set of contexts is determined to be associated with the invoked data. A presentation of the invoked data is configured according to context specific conditions defined for the determined context. The configured presentation of the data is displayed on a presentation interface.

20 Claims, 8 Drawing Sheets

CONFIGURING A PRESENTATION OF DATA BASED ON A CONTEXT

BACKGROUND

Software architecture of an application may be divided into different layers such as a persistency layer, an application layer, and a presentation layer. The persistency layer is the one where data is persisted and an interface for data accessing may be offered. The application layer includes business logic implemented for the business application. The presentation layer provides controls and interface components. The presentation layer may be a user interface (UI) with different graphical elements and user controls. The UI is accessed by users to execute different task with data persisted in the persistency layer and according to the logic defined in the application layer. The different layers are linked through common data models. Data models are used very often and satisfy customer company requirements for the applications. For example, an organizational structure may be defined with a data model and reflected into a business application. The definition of the structure may specify what entries a user can define to set up a company, person, and/or employment data. A data model includes defined fields. A new field may be added, or existing fields may be customized (e.g. renamed). Data models may be defined in standardized files with standard elements and corresponding fields. The definitions are adjustable to customer's preferences. Data is stored according to the data model definition in the persistency layer, for example, in a database.

The data model also includes properties, which may be related to the whole data model, to the elements defined in the data model, and/or to the fields of the elements. These properties have influence on the way data is presented. The properties may define whether a field is editable, and/or whether the field is hidden, and/or the field is in a read-only mode, and/or mandatory, etc. Data from the persistency layer is presented on the presentation layer according to the defined presentation properties in the data model. Two data model instances stored according to a particular data model may be requested for presentation on the presentation layer with different presentation properties compared to the defined presentation properties in the data model.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for configuring a presentation of data based on a context are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
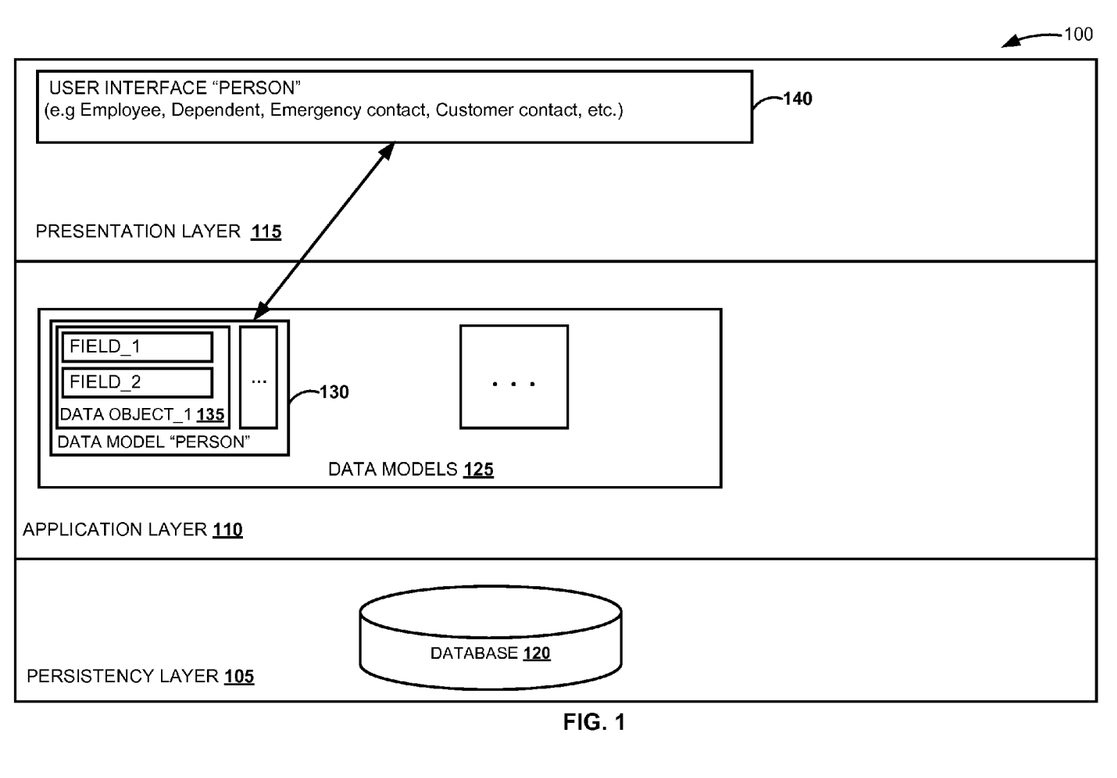
FIG. 1 is a block diagram illustrating a system for displaying data according to a data model.

FIG. 1 is a block diagram illustrating a system 100 for displaying data according to a data model. Data is persisted in a database 120 in a persistency layer 105 of the system 100. Data from the database 120 is stored according to defined data models 125 in the logic implemented in an application layer 110. The system 100 may be an application, such as an application utilized by companies to keep and track data related to companies' organizational structure. Data related to personal information for companies' employees, departments information, performance rates of the employees, etc. may be stored according to predefined data models. For example, a data model from the data models 125 may be defined to specify how a company's employee structure is reflected in the system 100 and what entries a user or administrator of the system 100 can create to set up company, person, and employment data. Customer-specific fields may be defined with the definition of the data model. An administrator or a software developer of the system 100 may define a data model from the data model 125. When a change in customer's requirements for the system 100 appears, one or more of the data models 125 may be refined and updated.

The data models 125 include, for example, a data model "Person" 130 that defines a structure of data objects to include personal data, such as a first name, a last name, an address, a phone number, a national card identification, a data of birth, a social security number, and other. For example, a data object from the data model "Person" 130 may include personal information, another data object may include address information, and yet another one may include biographical information. The data model "Person"

130 includes a "data object_1" 135 that is defined to include several fields, for example, a a "field 1" and a "field 2". For example, the "data object_1" 135 is a data object for structuring personal information, which includes fields—"First Name" and "Last Name" corresponding to "field 1" and "field 2", respectively. The data model "Person" 130 may further include other data objects apart from "data object_1" 135.

The data models 125 may be defined as a structure of data objects with data fields. The data models 125 may have assigned presentation properties. The data models 125 may include a definition of properties that have an influence on presentation of data stored in the database 120 on a presentation layer 115.

In one embodiment, properties, influencing the presentation of data are defined in the data model. The presentation properties may be defined on a data model level, and/or on a data object level, and/or on a field level. A data object comprising data fields may be defined as an element in a data model. The data object may be assigned with an object label, an identifier (ID), and properties influencing presentation of data stored in the database 120. For example, a property of a data object may define an order for presenting the data fields, or other appearance specifics for the presentation of data associated with the data object. The data fields defined within a given data object may be assigned with field identifiers (IDs), with field labels, and with field properties. The ID of a data object and the ID of a data field may define a unique identification that is used when referring to the particular data object or the data field. The ID of the data object may be unchangeable. However, the object label of a data object and the field label of a data field may define a name of the data object or respectively the data field. The name of the data object and the name of the data field may correspond to a type and description of data that is referred to with the data object and respectively the data field. The object label of a data object and the field label of a data field may be presented on the presentation layer 115 in relation to presenting data stored for the data object and the data field.

The data models 125 may be described in a file defined with a markup language, such as Extensible Markup Language (XML). Table 1 includes an exemplary XML file defining the data model "Person" 130. For example, the data model "Person" 130 may be defined in a human resource (HR) application and may describe people related to a company as entities to be stored in the database 120. The data model "Person" 130 describes a structure for storing personal information of people. The "data object_1" 135 is defined with an ID="PersonalInfo" and with an object label equal to "Personal Information". When there is no specific presentation property defining an order for presenting personal information stored according to the "data object_1" 135 with id="PersonalInfo", then the order for presenting the data fields within the data object may be such as the order defined in the data model definition in Table 1. Additional presentation properties on a data object level may be defined. For example, the presentation properties may be included as attributes in the <hris-elemen> in the XML file. For example, an exemplary syntax for defining attributes may be <hris-element <list-of-properties-with-corresponding-values>>. The first field in Table 1 is with an id="firstName" and with an field label "First Name". The second field is with an id="lastName" and with a label "Last Name". For the first and the second field there are presentation properties defined within the <hris-field> tag. The presentation properties in the data model definition specify how data stored according to the data model is displayed, for example, on the presentation layer 115. The presentation properties are defined with attributes, such as max-length, visibility, require, etc. For a presentation property associated with a maximum length of data to be displayed for a field, an attribute may be defined, e.g. max-length="32". A visibility property may be also defined through an attribute "visibility", which defines a visibility status for a field, e.g. on a UI. A mandatory field property may also be defined through an attribute "required", which defines when a field is mandatory to be filled in with a value when provided on a presentation interface. Other properties may also be defined.

TABLE 1

```
<hris-element id="PersonalInfo">
    <label>Personal Information</label>
    <hris-field max-length="32" id="firstName" visibility="both" required="true" pii="false">
        <label>First Name</label>
    <hris-field max-length="32" id="lastName" visibility="both" required="true" pii="false">
        <label>Last Name</label>
    </hris-field>
</hris-element>
```

For each property there may be a definition of possible attribute values to be inserted in the data model definition. For example, for the definition of a visibility property for a field, a value may be set for the attribute "visibility" according to three options: "none", "view", and "both". The value "none" is used when a field is hidden and no data can be imported for the field via an external file source, such as a Comma-separated values (CSV) file. The value "view" is used when a field is read-only and also no data can be imported for the field via an external file source. The value "both" is used when a field is visible and can be edited. Further values for the "visibility" attribute may be defined and maintained in the data model. In another example, to define whether a field is mandatory or not when presented, a value may be set for the attribute "required" according to two options: "true" and "false". When the value of the "required" attribute is "true", then the field is mandatory and the field is flagged as such on the UI. The user is required to enter a value for that field when interacting with data from that data field on the UI, in order to be able to save changes. When the value of the "required" attribute is "false", then the field is optional and no value is required to be provided by a user.

In the example from Table 1, the first and the second data fields in the "data object_1" 135 defined in Table 1 are assigned with field labels—"First Name" and "Last Name". The order in which the fields are about to be displayed on the UI is the order in which they are listed in the data model definition, as presented in Table 1. The presentation layer 115 may include a user interface "Person" 140 that provides options for user interaction of entering, displaying, updating, etc. data from the database 120 in relation to the data model "Person" 130. The UI "Person" 140 may be a graphical user interface (GUI). The UI "Person" 140 may display the "data object_1" 135 and the two data fields with the field labels The fields are presented on the UI as they are with presentation property for visibility equal to "both". A user interacting with the UI is required to enter data for the two fields, as the "required" attribute is set to "true". When a user requests to enter a new record for a person into the system 100, then the user will be requested to mandatory enter data for the two visible fields—"First Name" and "Last Name".

The UI "Person" 140 may be one and the same for every entry in the database 120, which is defined according to the data model "Person" 130. The entities stored in the database 120 may be related to personal data for an employee, or personal data for a spouse of an employee, or children of an employee, or an emergency contact of an employee, etc. There may be no differentiation between types of people that are stored in the system 100. Through entering data in the UI "Person" 140, the user may trigger pushing of data from the UI "Person" 140 to the database 120 according to logic defined in the application layer 140 in association with the data model "Person".

In another embodiment, the data model "Person" 130 may be edited to include a third data field, for example a "Person Type" field. The "Person Type" field may be defined together with a pick-up list including values to be selected when entering a new record in the database 120 as an instance of the data model "Person". For example, the pick-up list may define different types of people, such as an employee, a dependent of an employee, a customer contact information, an emergency contacts, etc. Further, the pick-up list may include team roles of people in an organization (e.g. manager, team leader, senior employee, intern, etc.), or other criteria for defining values. In another embodiment, the data model "Person" 130 may be edited to include information about relatives, contacts, etc., which may be used to link one person instance with another person instance stored in the database 120. For example, the database 120 may store data about employees of a company "A", together with other contact information related to other people associated with the employees. There may be two records for two people, denoted with "X" and "Y", where data stored for "X" refers to "Y" as the spouse of "X" and "Y" may be defined as a dependent of "X". "X" may be an employee of the company storing the data in the database 120.

There may be customer requirements for customizing the UI "Person" 140 in relation to records related to different types of entities stored in the database 120 based on the data model "Person" 130. The customer requirements may define that for different case, different UIs are generated. For example, different types of entities may define different contexts, where different presentation of data and UI generation may be provided. The differences in the UIs may include different labels and formatting of data from fields defined in the data model "Person" 130. A customization of presentation of the data may be defined as a UI configuration associated with the data model "Person". The UI configuration may include rules and conditions for presenting data from data objects and fields of the data model "Person" 130 in relation to a set of predefined contexts. A context from the set of contexts may be defined for a specific condition that is met by a stored data model instance in the database 120. A context may be determined based on evaluation of data stored.

The presentation of data may be different in different contexts. A context may be determined in relation to determination of a type of an entity stored in the database 120 according the data model "Person" 120. When a particular context is determined, a presentation of data for the entity may be different in comparison to the presentation generated according to the presentation properties, labels, and order, defined in the data model "Person" 130. For example, a customer requirement may define that an address field for an entity defined in the database 120 is a mandatory field, when the entity is an employee, and an optional field, when the entity is determined as a dependent of an employee, e.g. a child of the employee. Determining of a type of the entity may be performed based on evaluation of the data entered for the entity in the database.

Figure 2:
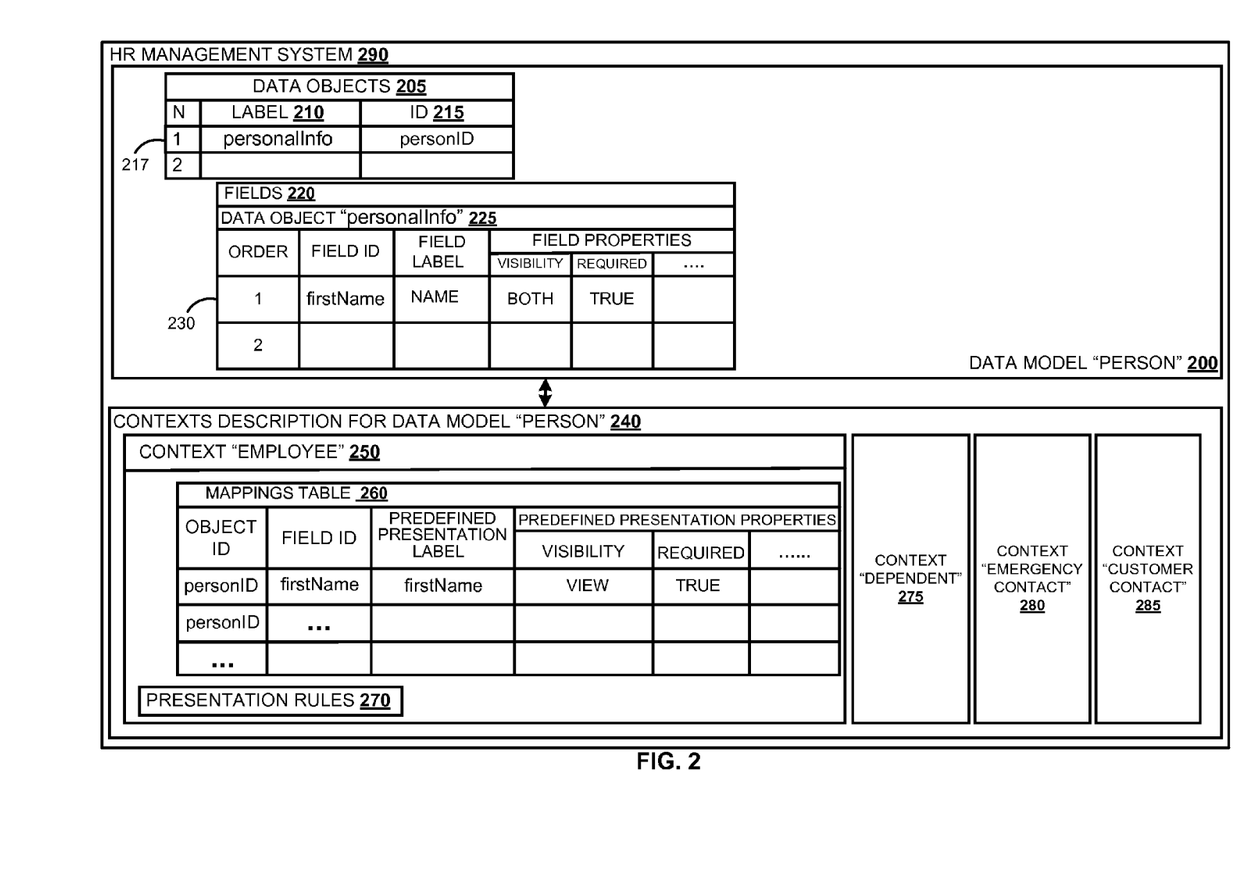
FIG. 2 is a block diagram illustrating an exemplary definition of a data model defined in an HR management system and configuration for presenting data following the data model, according to one embodiment.

FIG. 2 is a block diagram illustrating an exemplary definition of a data model defined in an HR management system and configuration for presenting data following the data model, according to one embodiment. A data model "Person" 200 is defined to include a set of data objects 205. The data model "Person" 200 may be such as the data model "Person" 130 of FIG.1. Objects in the data model "Person" 200 are assigned with labels and object IDs. A data object may be assigned with one or more fields. Fields included in an object are assigned with field IDs, field labels, and field properties. The data objects 205 may be defined with a label 210 and an ID 215. For example, a data object "personalInfo" with an object ID "personID" is defined at row 217. Fields 220 are defined for the data objects 205 from the data model "Person" 200. A data object "personalInfo" 225 is a data object with ID—"personID", as defined at row 217. The data object "personalInfo" 225 is assigned with one or more fields, such as a field with field ID="firstName". Row 230 defines the field with field ID="firstName". The fields 220 have corresponding attributes that define presentation properties for the fields 220. For field defined in row 230, fieldID is defined as "firstName", a field label is defined as "NAME", and field properties are defined. The definition of presentation properties for the fields may be similar to the definition of properties defined in relation to Table 1. The field properties define that the field "firstName" is visible and editable when presented, as a visibility attribute is set to "both". Attribute required is set to "true", which defines that the field is mandatory to be filled with values when presented on the UI. Further presentation properties may be defined according to the defined attributes for fields from objects from the data model "Person" 200.

Further, the fields 220 may be defined for data objects in an order that determined the order for presentation the fields 220 on the UI. For example, for a field from the fields 220, an order attribute may be assigned, and an order value may be defined. For fields "firstName", the order value is set to "1". The value "1" may be interpreted so that the field "firstName" is presented on top of the presented information associated with data object "personalInfo" 225 on the UI.

In one embodiment, the data model "Person" 200 may be used for storing data in a database that may be used by an application, such as an HR management system 290. The HR management system may be such as the system 100, FIG. 1. The database may be such as the database 120, FIG.1. The data that is stored in the database may refer to different types of entities, such as employees, relatives to the employees, contacts of the employees, etc. Different contexts may be predefined in association with the data model "Person" 220 when utilized in the particular HR management system 290. The contexts may be determined when an entity from the database is selected for presentation on a UI of the HR management system 290. A set of contexts may be defined for the data model "Person" 200. A context may define specific context requirements and conditions for presenting and storing data. For example, a context from the context may be associated with a type of an entity. Based on determining the type of an entity, a context from a set of contexts may be determined In one embodiment, contexts description for data model "Person" 240 may be defined. For example, a context "Employee" 250, a context "Dependent" 275, a context "Emergency Contact" 280, and a context "Customer Contact" 285 are a set of predefined contexts in the HR management system 290. Further additional contexts may be defined for the data model "Person" 240. A context is defined for a specific condition that is met by a stored data model instance. A context may be determined based on evaluation of data stored. For example, when a record is stored in the HR management system 290 with data of an employee based on the data model "Person" 200, then the context "Employee" may be determined. A context may be associated with context specific conditions for presenting the stored data in the HR management system 290. For example, the context "Employee" 250 may define context specific conditions associated with configuration mappings defining correspondence between field IDs of the fields 220, predefined presentation labels for the fields 220, and the predefined presentation properties for the fields 220. The configuration mappings may be defined in a mappings table 260, where a row in the mappings table 260 defines a correspondence between an objectID (such as ID 215), a field ID, a predefined presentation label, and predefined presentation properties. The mappings table 260 may be used to configure presentation of data stored for data objects and data fields based on matching the object IDs and field IDs. In one embodiment, the predefined presentation labels and the predefined presentation properties defined in the mappings table 260 may replace a corresponding field label and field properties defined in the data model "Person" 200. The presentation labels and properties may be changed at the UI of the HR management system 290. The predefined presentation label may alter the field label defined in the data model "Person" 200. For example, a field label "Name" may be presented as "First Name", when context "Employee" 250 is determined. In another example, the attribute for visibility may be changed from "both" to "view", which may limit modification of the field and make the field read-only. Further, for context "Employee" 250, additional presentation rules 270 may be defined. For example, the presentation rules 270 may include further rules for formatting data when presented on the UI, or for example may define an order for presenting fields from the data model "Person" 200. The order for presenting fields defined in the presentation rules 270 may be different from the order defined in the data model "Person" 200, as discussed above.

In an example, a request to present data for a user with a user name "abc" may be received though the UI of the HR management system 290. When the name "abc" corresponds to an entity in the database that defines an employee, then the HR management system 290 may determine that the context for presenting data is the context "Employee". Based on the received request, data for the user with name "abc" is invoked from the database according to the data model "Person" 200. The invoked data is presented on the UI of the HR management system 290 according to the context specific conditions for presenting the data as defined for context "Employee" 250.

Figure 3:
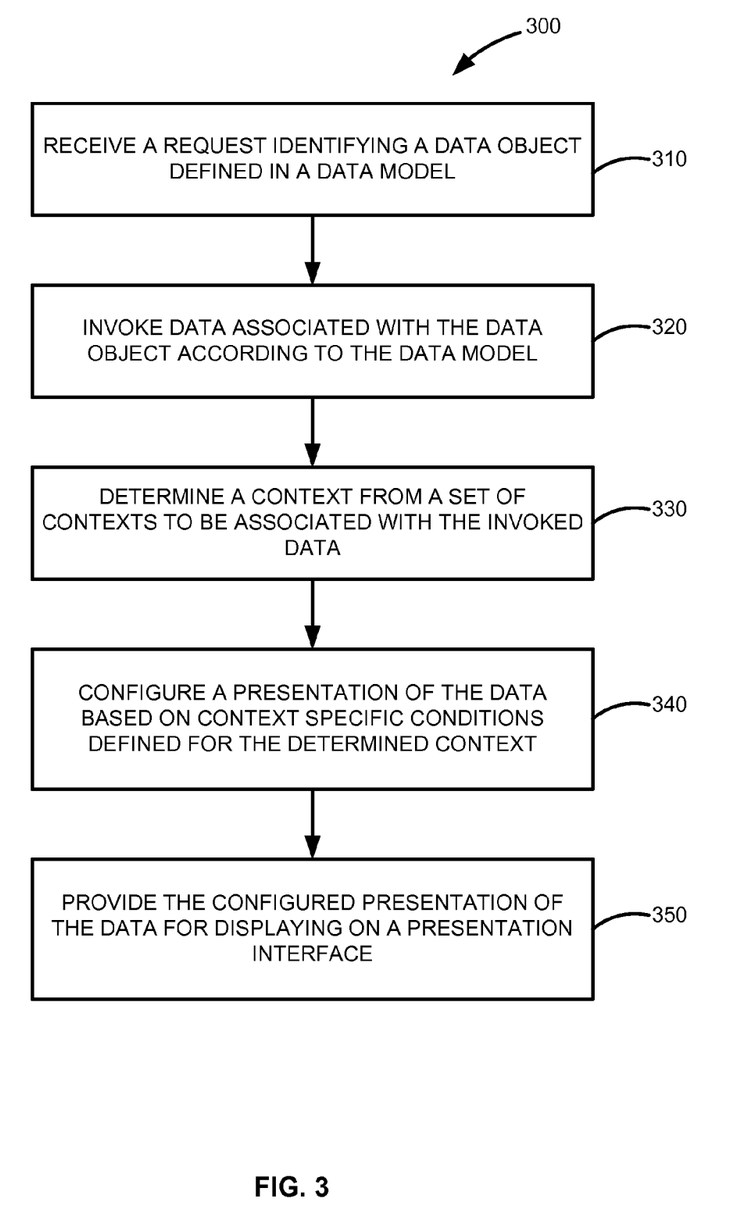
FIG. 3 is a flow diagram illustrating a process for configuring a presentation of data based on a determined context, according to one embodiment.

FIG. 3 is a flow diagram illustrating a process 300 for configuring a presentation of data based on a determined context, according to one embodiment. At 310, a request is received, which identifies a data object defined in a data model. The data model may be such as the data model "Person" 130 of FIG. 1 and data model "Person" 200 of FIG. 2. For example, the request may define a first name of an employee. Data about the employee may be stored in a system such as the HR management system 290 of FIG.2. The data may be stored according to the data model "Person" 200, which defined a set of data objects and data field. At 320, data associated with the data object is invoked according to the data model. The data associated with the data object may include data for fields defined for that data object. For example, if the data object is "personalInfo" 225, then data stored for the fields of the data object "personalInfo" 225 may be invoked.

The invoked data may further include data associated with other data objects related to the identified data object from the data model. At 330, a context from a set of contexts is determined to be associated with the invoked data. In one embodiment, the set of contexts and the context descriptions may be pre-defined, for example, the contexts description of data model "Person" 240 in FIG. 2 may be pre-defined. At 340, a presentation of the invoked data is configured, where the configuration is based on context specific conditions defined for the determined context. The context specific conditions may define presentation properties and rules that may be used when generating the presentation of the invoked data. At 350, the configured presentation of the data is displayed on a presentation interface.

Figure 4:
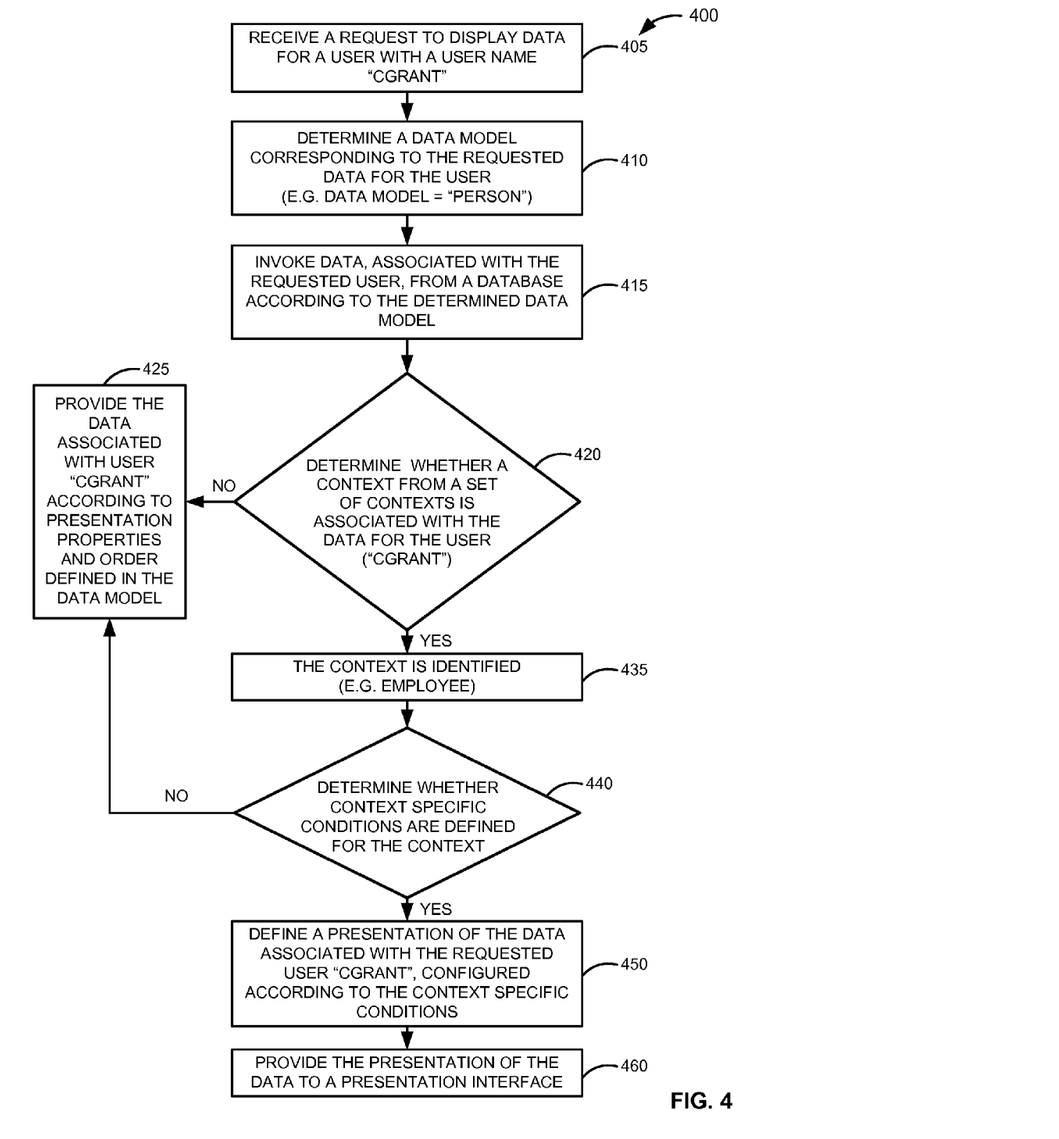
FIG. 4 is a flow diagram illustrating a process for providing data for a user on a presentation interface of an application, according to one embodiment.

FIG. 4 is a flow diagram illustrating a process 400 for providing data for a user on a presentation interface of an application, according to one embodiment. At 405, a request to display data for a user with a user name "cgrant" is received. The received request identifies a data object defined in a data model. Based on the request received at 405, the data model corresponding to the requested data for the user is determined at 410. For example, the data model associated with the user with the user name "cgrant" may be a data model "Person". The data model "Person" may describe personal information for people associated with a given company "A". The data model "Person" may be such as the data model "Person" 200, FIG. 2. A database may store data for different people with different person identifiers. The database may include information for the user with the user name "cgrant". For example, Carla Grant may be an employee of the company "A", and as an employee, the database may store personal information for Carla Grant by referring to her with a user name "cgrant". Additionally, Carla Grant may have a person identifier (personID), which may be a unique field stored in relation to data for Carla Grant. The data in the database may be stored according to a schema defined in the data model "Person". The data model "Person" may comprise data objects with fields. One of the data object may include a field "userName" for storing user names of employees. At 415, data is invoked from a database according to the determined data model "Person". The invoked data is associated with the requested user with user name "cgrant". Table 1 includes an exemplary set of invoked data associated with the user with user name "cgrant". Table 1 includes the fields defined in a data object "PersonalInfo" from the data model "Person". Table 1 includes an ordered list of fields as defined in the data model "Person" in the table columns.

TABLE 1

| fieldId | | | | | |
|---|---|---|---|---|---|
| username | firstName | lastName | dateOfBirth | spouse | child |
| cgrant | Carla | Grant | 01.01.1980 | bgrant | wgrant |

At 420, it is determined whether a context from a set of contexts is associated with the data for the user with the user name "cgrant". The set of contexts may be generally pre-defined for the data model. A context may be predefined for a particular value entered for a field from a record stored according to the data model. If it is determined that a context from the set of contexts is not associated with the invoked data, then the process 400 goes to 425. At 425, data associated with the user "cgrant" is provided according to presentation properties and order defined in the data model.

In one embodiment, a context from the set of contexts may be associated with context specific conditions for presentation of data from records stored according to the data model. The set of contexts may be defined to correspond to different types of entities stored with records in the database. For example, four contexts are defined in an application for entities, which are employees, dependents of an employee (e.g. spouse and/or child), emergency contacts of an employee, and/or customer contacts of an employee. The contexts may be denoted as "Employee", "Dependent", "Emergency contact", and "Customer contact". The record for the requested user with user name "cgrant" comprises information that defines the user as an employee.

Based on evaluation of the data for the user "cgrant" and a determination that a context is predefined, at 435, the predefined context is identified. For example, the determined context is "Employee", when the data stored for the user "cgrant" refers to data stored for an employee. At 440, context specific conditions defined for the context "Employee" are determined. The context specific conditions define a configuration for the invoked data when presenting on a presentation interface. For example, the data may be presented on a UI of an application where the request is received at 405. When it is determined that there are no context specific conditions defined for the context "Employee", then the invoked data 415 is presented at 425 (according to the presentation properties and order defined in the determined data model "Person"). When it is determined that there are context specific conditions for the determined context, then at 450 a presentation of the data is defined. The presentation of the data associated with the requested user "cgrant" is configured according to the context specific conditions associated with the context "Employee". The context specific conditions associated with the context "Employee" may be such as the conditions described in relation to context "Employee" 250, FIG. 2. There may be a mappings table that defines predefined presentation labels, predefined presentation properties, and an order for presentation of fields from the data model "Person".

Table 2 includes an exemplary configuration of the presentation of data for context "Employee". The configuration defines predefined presentation labels at column "FieldLabel", a predefined presentation property for the visibility status of the fields, and an order for presenting the fields and field values. The order defined in the configuration as described in Table 2, switches the places of a first and last name, compared to the order defined in the data model (presented in Table 1).

TABLE 2

| Order | FieldID | FieldLabel | Visibility |
|---|---|---|---|
| 1 | username | User | view |
| 2 | lastName | Last Name | both |
| 3 | firstName | First Name | view |
| 4 | dataOfBirth | Birthdate | view |

At 460, the configured presentation of the data is provided to a presentation interface. The presentation interface may be a GUI of an application, such as the HR management system 290, FIG. 2.

Figure 5:
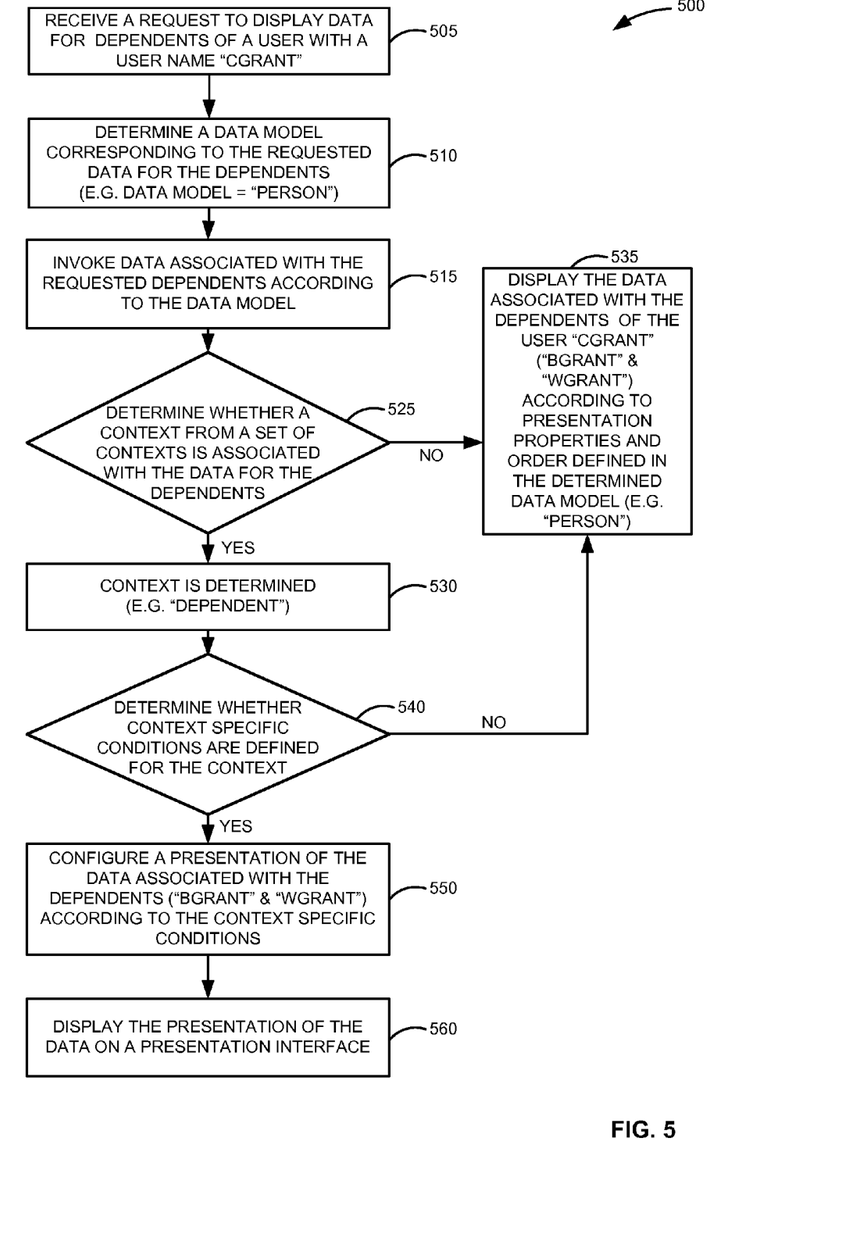
FIG. 5 is a flow diagram illustrating a process for providing data related to a dependent of a user on a presentation interface of an application, according to one embodiment.

FIG. 5 is a flow diagram illustrating a process 500 for providing data related to a dependent of a user on a presentation interface of an application, according to one embodiment. The application may be associated with storage, where data for different types of people is persisted. A data model "Person" may be used to define a schema for storing personal information. The application may be an HR application, such as the HR management system 290 of FIG.2. The stored information may be related to employees of a company, relatives of employees, emergency contacts, business contacts, customer representatives, and so on. At 505, a request is received to display data for dependents of a user with a user name "cgrant". For example, the storage may be a database comprising information stored according to the data model. The data model "Person" may be similar to the data model "Person" 130 of FIG. 1, the data model "Person" 200 of FIG. 2, or the data model "Person" of FIG. 4. The database may include information for users defined in the application. For example, users defined in the application, may be employees of an organization or company, which utilized the application for managing corporate human resource tasks. The information may include information for a user with the user name "cgrant". The information stored for the user may be such as the information included in Table 1. Further, the database may comprise information for other people, related to the users defined in the application. The information for the other people may also be stored according to the data model "Person". For example, the database may comprise information for a spouse and/or a child of a given user. A record from the database describes a person according to defined data objects with data fields. Some record may be for employees, other may be for dependents of employees, other may be for business contacts, etc. At 510, a data model corresponding to the requested data for the dependents of the user is determined. The data model that is determined is the data model that is used in the database to store information for entities, which are categorized as dependents. The data model including the data objects with fields may be similar to the data model "Person" 200 of FIG. 2. For example, records in the database may be stored according to the data model and may include fields referring to dependents of people. One record for a person may refer to another record, storing information for the spouse of the person from the first record. Additionally, there may be data for people that are children of employees. Based on evaluation of records in the database and existing references to dependents for the user with user name "cgrant", a list of dependents is determined With the exemplary information for the user with user name "cgrant", the list of dependents includes two people—a spouse with a user name "bgrant" and a child with a user name "wgrant". At 515, data associated with the requested dependents according to the data model "Person" is invoked. Table 3 includes an exemplary set of data invoked for the dependents.

TABLE 3

| | fieldId | | | | |
|---|---|---|---|---|---|
| username | firstName | lastName | dateOfBirth | spouse | child |
| bgrant | Bill | Grant | 02.02.1979 | cgrant | |
| wgrant | Will | Grant | 01.01.2005 | | grant |

At 525, it is determined whether a context from a set of contexts is associated with the data for the dependents. The set of contexts may be predefined and may be such as the contexts defined and discussed in relation to FIG. 2 and FIG.

4—contexts "Employee", "Dependent", "Emergency contact", and "Customer contact". If no context is associated with the invoked data, then the process 500 goes to 535. At 535, the data associated with the dependents of the user with user name "cgrant" is displayed according to presentation properties and order defined in the determined data model (the data model "Person"). When there is a defined context for the requested data, then process 500 goes to 530. The requested data at 505 is associated with dependents, and a context for people of type dependents entered in the application according to the data model "Person" is defined. Then at 530, the context is determined to be context "Dependent", which is selected from the four predefined contexts. At 540, it is determined whether context specific conditions are defined for the determined context. If there are no context specific conditions defined for the context "Dependent", then process 500 goes to 535. When there are context specific conditions defined for the context "Dependent", then the process 500 goes to 550. Table 4 includes a description of an exemplary configuration of presentation of data when context "Dependent" is determined The configuration may define specific field labels to be presented on a presentation layer of the application. The configuration may also define a specific order for presenting the fields and presentation properties of the fields. The presentation properties of the fields for context "Dependent" may be different from the presentation properties defined for the data model "Person". Also, the presentation properties of the fields for context "Dependent" may be different from the presentation properties defined for context "Employee".

TABLE 4

| Order | FieldID | FieldLabel | Visibility |
|---|---|---|---|
| 1 | username | User | none |
| 2 | lastName | Family Name | view |
| 3 | firstName | First Name | view |
| 4 | dataOfBirth | Birthdate | view |

At 550, a presentation of the data associated with the dependents with user names "bgrant" and "wgrant" is defined. The presentation is configured according to the context specific conditions that are associated with the determined context "Dependents" and are determined at 540. The invoked data from the fields at 515 (presented in Table 3) is matched with the defined presentation properties and order defined in the context specific conditions for context "Dependent". The matching is based on correspondence between the field identifiers (fieldID columns in Table 3 and Table 4). At 560, the presentation of the data is displayed on a presentation interface. The configured presentation includes field labels as defined in the context specific conditions and presented in Table 4.

Figure 6:
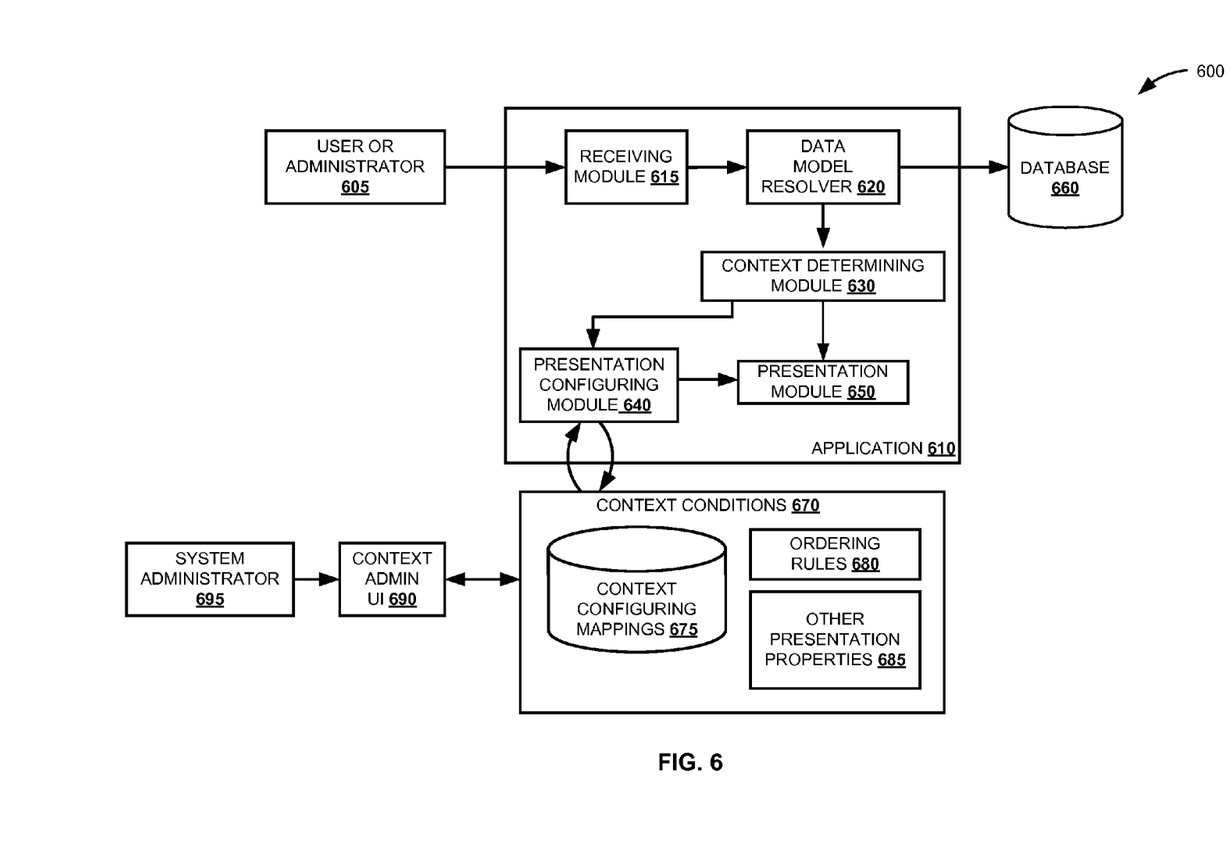
FIG. 6 is a block diagram illustrating an exemplary system for displaying data according to defined context configuration conditions for presenting data following a data model definition, according to one embodiment.

FIG. 6 is a block diagram illustrating an exemplary system 600 for displaying data according to defined context configuration conditions for presenting data following a data model definition, according to one embodiment. A user or administrator 605 sends a request to an application 610. The application 610 may be an HR application providing services for managing information related to people associated with a particular company or organization. The application 610 is associated with a database 660. The database 660 persists data that may be accessed by the application 610. The application 610 comprises a receiving module 615, a data model resolver 620, a context determining module 630, a presentation module 650, and a presentation configuring module 640. The data stored in the database 660 by the application 610, may be stored according to data models defining structures of data objects with data fields for storing different type of information. The data models may be such as the data models 125, FIG. 1, the data model "Person" 200, FIG. 2, etc. Different data models may be utilized for storing data in the database 660.

The user or administrator 605 sends a request via a communication channel to a receiving module 615. The user or administrator 605 provides information associated with a data object associated with a data model. The data model is one of the data models. For example, the user or administrator 605 may provide a user name of a user, where data is stored for the user according to the used data model. The request send from the user or administrator 605, may be such as the requests received at 310, process 300, FIG. 3, or received at 405, process 400, FIG. 4, The receiving module 615 transmits the received data from the request from the user 605 to a data model resolver 620. The data model resolver 620 determines the data model that is associated with the received request from the user 605. For example, the data model that is determined by the data model resolver 620 if a request such as the requests received at processes 300, FIG. 3, process and/or 400, FIG. 4, is the data model "Person". When the data model is determined, the data model resolver 620 invokes data from the database 630. The invoked data is associated with the received request. The data model resolver 620 communicates with the context determining module 630 to provide invoked data from the database 660. The context determining module 630 determines whether contexts are defined for the determined data model. The context determining module 630 determining a set of contexts that are associated with the determined data model. Based on the invoked data that is provided by the data model resolver, the context determining module 630 determines whether a context from the set of contexts is associated with request.

The context determining module 630 communicates with the presentation configuring module 640 and the presentation module 650. When there is no context determined by the context determining module 630, then the invoked data by the data model resolver 620 is transmitted by the context determining module 630 to the presentation module 650. When there is a context determined by the context determining module 630, then the invoked data is configured to be presented by the presentation configuring module 640. The configuration of the presentation of the invoked data is performed based on context specific conditions that are defined for the determined context. Context conditions 670 module stores description of different contexts that are defined for a number of data models that are utilized by the application 610. The context conditions 670 module include context configuring mappings 675, ordering rules 680, and other presentation properties 685. The context configuring mappings 675 may be mappings that define rules for presentation of data stored according to different data models and correspondingly defined contexts. The context configuration mappings 675 may be stored in form of a mappings table for a context defined for a data model. The mappings table may be such as the mappings table 260, FIG. 2. The context configuring mappings 675 may include presentation configuring mappings for fields defined for data objects in a data model. The mappings may define a correspondence between a field identifier, predefined presentation labels, and predefined presentation properties for the field. The presentation configuring module 640 communicates with the context conditions 670 module to determine context specific conditions associated with the determined context by the context determining module 630. The presentation configuring module 640 configures the presentation of the invoked data and provides it to the presentation module 650. The presentation module 650 displays the configured presentation of the requested data by the user 605, for example, of the user interface of the application 610.

In one embodiment, the context conditions 670 module is associated with a context admin UI 690 module. The context admin UI 690 module is accessible for requests to define contexts associated with data models. A system administrator 695 may access the context admin UI 690 to define context description and context specific rules in the context conditions 670 block. The data models are used for storing data in the database 660 and are used in the implementation logic of the application 610. The context admin UI 690 module may be used to define new, and/or update and/or delete existing context specific conditions associated with a specific context predefined for a data model. For example, the context admin UI 690 module may be used to define a new context for the data model "Person"—a fifth context "Representative contact". The "Representative contact" context may define context specific conditions for presenting data for people, who are related to employees and stored as representative contacts.

Figure 7:
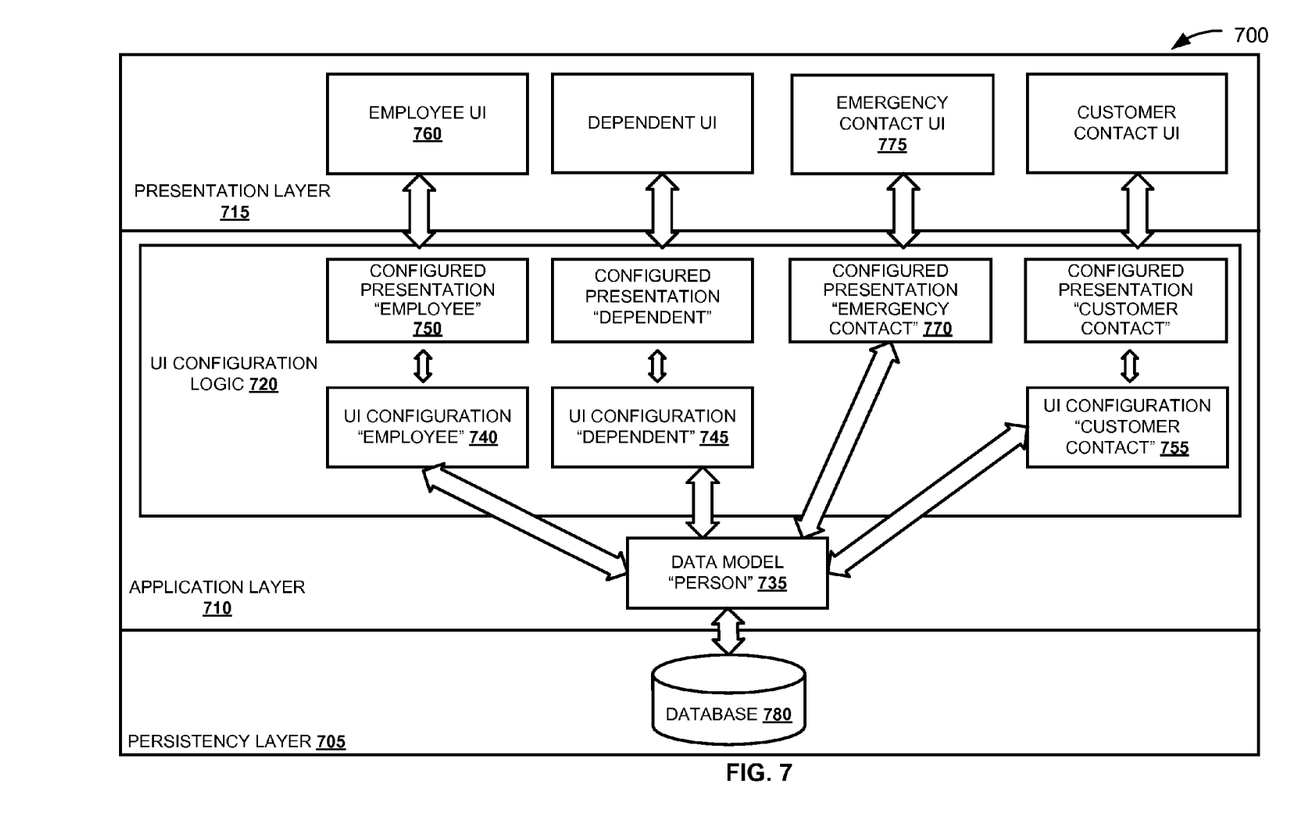
FIG. 7 is a block diagram illustrating an exemplary system for displaying data according defined UI configuration conditions, according to one embodiment.

FIG. 7 is a block diagram illustrating an exemplary system 700 for displaying data according defined UI configuration conditions, according to one embodiment. The system 700 comprises a persistency layer 705, an application layer 710, and a presentation layer 715. The system 700 may be an application, such as the HR management system 290, FIG. 2. The persistency layer 705 includes a database 780 that comprises data stored according to a set of data models. The data models are applied in the application logic defined in the application layer 710. The application layer 710 includes a UI configuration logic 720 that defines context specific conditions for configuring presentation of data for a set of contexts associated with a data model. The UI configuration logic 720 module defines context specific conditions for a set of four predefined contexts for the data model "Person" 735. A data model "Person" 735 may be used by the database 780 and by the application layer 710 for storing data. The data model "Person" 735 may be such as the data model "Person" 130, FIG. 1, the data model "Person" 200, FIG. 2, etc. A set of contexts may be predefined for the data model "Person" 200. The set of contexts are associated with specific conditions that are met by a record stored according to the data model "Person".

The predefined contexts are "Employee", "Dependent", "Emergency contact", and "Customer contact". There are context specific conditions for presenting data associated with a context from the set of contexts. Data that is stored in the database 780 and is associated with the data model "person" may be classified and different types of entities may be determined that correspond to different contexts from the set of defined contexts. For example, a first record from the database 780, associated with the data model "Person" 735, may be stored with an entity, which is classified as an employee. Other records may be associated with dependents of the entity classified as an employee.

The context specific conditions for context "Employee" are defined at UI configuration "Employee" 740 module. The context specific conditions for context "Dependent" are defined at UI configuration "Dependent" 745 module. The context specific conditions for context "Customer contact" are defined at UI configuration "Customer contact" 755 module. There are no context specific conditions for a UI configuration for context "Emergency contact". Therefore, when context "Emergency contact" is determined, the data that is requested under that context is presented according to the presentation properties and order defined in the data model "Person" 735. A configured presentation "Emergency contact" 770 is generated as defined in the data model "person" 735. The configured presentation "Emergency contact" 770 is provided to the presentation layer 715, and an Emergency contact UI 775 is displayed.

The context specific conditions defining how data stored according to the data model is presented for different contexts. Based on the context specific conditions related to a context, a configured presentation of data invoked from the database 780 is generated. For example, when context "Employee" is determined for a record of data from the database 780, then the invoked data is configured according to the UI configuration "Employee" 740 and configured presentation "Employee" 750 is generated. The configured presentation 750 is provided to the presentation layer 715 to be displayed on an Employee UI 760. Respectively, based on the UI configuration "Dependent" 745 and the UI configuration "Customer contact" 755, configured presentations of data may be generated and provided to the presentation layer 715 to be displayed.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
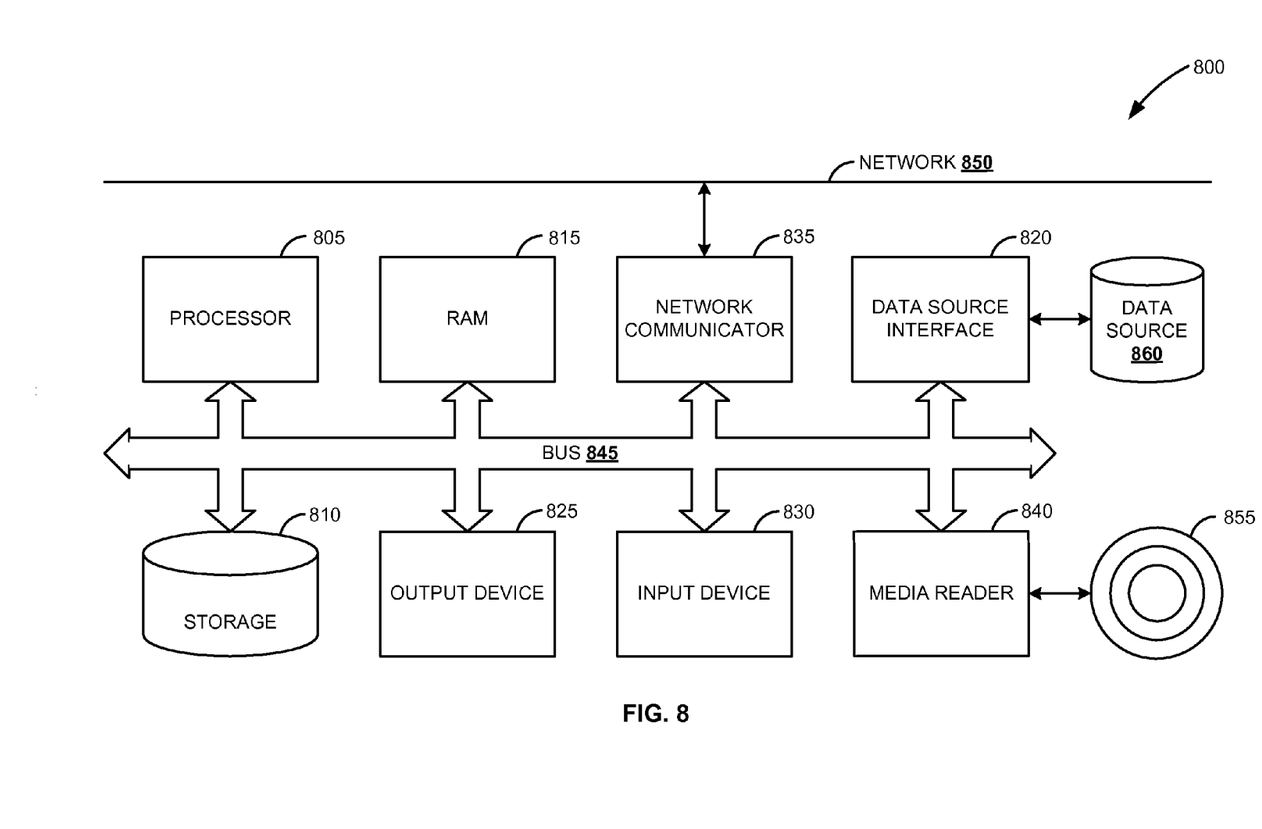
FIG. 8 is a block diagram illustrating an embodiment of a computing environment in which the techniques described for configuring a presentation of data based on a context definition can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system X00 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
receiving a request identifying a data object defined in a data model, wherein the data model is associated with a plurality of entity types, wherein each entity type corresponds to a particular context associated with the data model, and wherein each particular context is associated with a predefined set of presentation properties specific to the particular context;
invoking data associated with the data object according to the data model;
determining whether a particular context from a set of contexts is associated with the invoked data and the identified data object, wherein determining whether the invoked data and the identified data object are associated with a particular context comprises:
determining, from the invoked data, an entity type associated with the identified data object; and
comparing the determined entity type with the contexts in the set of contexts to determine whether the determined entity type matches one of the set of contexts;
in response to determining that a particular context from the set of contexts is associated with the invoked data and the identified data object:
configuring a presentation of the data based on the predefined set of presentation properties specific to the particular context; and
providing the configured presentation of the data for displaying on a presentation interface; and
in response to determining that none of the particular contexts from the set of contexts are associated with the invoked data and the identified data object, providing a default presentation of the data for displaying on the presentation interface.

2. The method of claim 1, further comprising:
defining the data model to describe a structure of one or more data objects comprising one or more fields, and wherein the data model is assigned with one or more presentation properties.

3. The method of claim 2, further comprising:
assigning one or more object identifiers and one or more object labels to the one or more data objects described in the structure of the data model.

4. The method of claim 2, further comprising:
assigning the one or more fields with one or more field identifiers, one or more field labels, and one or more field properties.

5. The method of claim 1, wherein the data associated with the data object is invoked from a database and comprises fields' data, field identifiers, field labels, and field properties assigned to a plurality of fields of one or more data objects defined in the data model, wherein the one or more data objects are associated with the data object.

6. The method of claim 5, further comprising:
defining the predefined set of presentation properties specific to the particular context, wherein the predefined set of presentation properties specific to the particular context define how to present the data, stored according to the data model and associated with the particular context, on the presentation interface.

7. The method of claim 6, wherein the predefined set of presentation properties specific to the particular context define, for the particular context, predefined presentation labels defined correspondingly to the plurality of fields of the data object, and to a predefined order for presenting the predefined labels for the plurality of fields together with the fields' data.

8. The method of claim 7, wherein the predefined set of presentation properties specific to the context are defined in relation to configuration mappings defining correspondence between the field identifiers, the predefined presentation labels, and the predefined presentation properties for the plurality of fields.

9. The method of claim 8, wherein configuring the presentation of the data based on the predefined set of presentation properties specific to the particular context further comprises:
determining the plurality of fields of the data object based on the data model;
based the configuration mappings and the field identifiers, matching the predefined presentation labels with the fields' data;
ordering the predefined presentation labels with the fields' data according to the predefined order; and
defining the presentation of data according to the predefined presentation properties.

10. A computer system comprising:
at least one processor;
a memory in association with the at least one processor storing instructions related to:
receive a request identifying a data object defined in a data model, wherein the data model is associated with a plurality of entity types, wherein each entity type corresponds to a particular context associated with the data model, and wherein each particular context is associated with a predefined set of presentation properties specific to the particular context;
invoke data associated with the data object according to the data model;
determine whether a particular context from a set of contexts is associated with the invoked data and the identified data object, wherein determining whether the invoked data and the identified data object are associated with a particular context comprises:
determining, from the invoked data, an entity type associated with the identified data object; and
comparing the determined entity type with the contexts in the set of contexts to determine whether the determined entity type matches one of the set of contexts;
in response to determining that a particular context from the set of contexts is associated with the invoked data and the identified data object:
configure a presentation of the data based on the predefined set of presentation properties specific to the particular context; and
provide the configured presentation of the data for displaying on a presentation interface; and
in response to determining that none of the particular contexts from the set of contexts are associated with the invoked data and the identified data object, provide a default presentation of the data for displaying on the presentation interface.

11. The system of claim 10, wherein the data model describes a structure of one or more data objects comprising one or more fields, wherein the one or more data objects are assigned with one or more object identifiers and one or more object labels, and wherein the one or more fields are assigned with one or more field identifiers, one or more field labels, and one or more field properties.

12. The system of claim 10, wherein the data associated with the data object is invoked from a database and comprises fields' data, field identifiers, field labels, and field properties assigned to a plurality of fields of one or more data objects defined in the data model, wherein the one or more data objects are associated with the data object.

13. The system of claim 12, further comprising instructions to:
define the predefined set of presentation properties specific to the particular context, wherein the predefined set of presentation properties specific to the particular context define how to present the data, stored according to the data model and associated with the particular context, on the presentation interface.

14. The system of claim 12, wherein the predefined set of presentation properties specific to the context are related to configuration mappings defining correspondence between the field identifiers, predefined presentation labels, and predefined presentation properties for the plurality of fields.

15. The system of claim 14, wherein the predefined set of presentation properties specific to the context are related to predefined presentation labels defined correspondingly to the plurality of fields of the data object, and to a predefined order for presenting the predefined labels for the plurality of fields together with the fields' data, and wherein the instructions to configure the presentation of the data further comprises instructions to:
determine the plurality of fields of the data object based on the data model;
based the configuration mappings and the field identifiers, match the predefined presentation labels with the fields' data;
order the predefined presentation labels with the fields' data according to the predefined order; and
define the presentation of data according to the predefined presentation properties.

16. A non-transitory computer-readable medium storing instructions, which when executed cause a computer system to:
- receive a request identifying a data object defined in a data model, wherein the data model is associated with a plurality of entity types, wherein each entity type corresponds to a particular context associated with the data model, and wherein each particular context is associated with a predefined set of presentation properties specific to the particular context;
- invoke data associated with the data object according to the data model;
- determine whether a particular context from a set of contexts is associated with the invoked data and the identified data object, wherein determining whether the invoked data and the identified data object are associated with a particular context comprises:
  - determining, from the invoked data, an entity type associated with the identified data object; and
  - comparing the determined entity type with the contexts in the set of contexts to determine whether the determined entity type matches one of the set of contexts;
- in response to determining that a particular context from the set of contexts is associated with the invoked data and the identified data object:
  - configure a presentation of the data based on the predefined set of presentation properties specific to the particular context; and
  - provide the configured presentation of the data for displaying on a presentation interface; and
- in response to determining that none of the particular contexts from the set of contexts are associated with the invoked data and the identified data object, provide a default presentation of the data for displaying on the presentation interface.

17. The computer-readable medium of claim 16, wherein the data model describes a structure of one or more data objects comprising one or more fields, wherein the one or more data objects are assigned with one or more object identifiers and one or more object labels, and wherein the one or more fields are assigned with one or more field identifiers, one or more field labels, and one or more field properties.

18. The computer-readable medium of claim 16, wherein the data associated with the data object is invoked from a database and comprises fields' data, field identifiers, field labels, and field properties assigned to a plurality of fields of one or more data objects defined in the data model, wherein the one or more data objects are associated with the data object.

19. The computer-readable medium of claim 18, further storing instructions to:
- define the predefined set of presentation properties specific to the particular context, wherein the predefined set of presentation properties specific to the particular context define how to present the data, stored according to the data model and associated with the particular context, on the presentation interface; and
- wherein the predefined set of presentation properties specific to for the context are related to configuration mappings defining correspondence between the field identifiers, predefined presentation labels, and predefined presentation properties for the plurality of fields.

20. The computer-readable medium of claim 19, wherein the predefined set of presentation properties specific to the context are related to and predefined presentation labels defined correspondingly to the plurality of fields of the data object, and to a predefined order for presenting the predefined labels for the plurality of fields together with the fields' data, and wherein the instructions to configure the presentation of the data further store instructions to:
- determine the plurality of fields of the data object based on the data model;
- based the configuration mappings and the field identifiers, match the predefined presentation labels with the fields' data;
- order the predefined presentation labels with the fields' data according to the predefined order; and
- define the presentation of data according to the predefined presentation properties.

* * * * *